W. L. R. EMMET.
ELECTRIC SHIP PROPULSION.
APPLICATION FILED JULY 8, 1915.

1,290,946.

Patented Jan. 14, 1919.
2 SHEETS—SHEET 1.

Inventor:
William L. R. Emmet,
by
His Attorney.

W. L. R. EMMET.
ELECTRIC SHIP PROPULSION.
APPLICATION FILED JULY 8, 1915.

1,290,946.

Patented Jan. 14, 1919.
2 SHEETS—SHEET 2.

Inventor:
William L. R. Emmet,
by Allen S. Davis
His Attorney.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

ELECTRIC SHIP PROPULSION.

1,290,946.          Specification of Letters Patent.      Patented Jan. 14, 1919.

Application filed July 8, 1915. Serial No. 38,808.

*To all whom it may concern:*

Be it known that I, WILLIAM L. R. EMMET, a citizen of the United States, residing at Schenectady, county of Schenectady, State of New York, have invented certain new and useful Improvements in Electric Ship Propulsion, of which the following is a specification.

My invention relates to electric ship propulsion, and in particular to the propulsion of ships by alternating current induction motors. The object of my invention is to provide a novel and improved method of operating a system of electric ship propulsion, and a novel arrangement of apparatus for carrying out this method. A further object of my invention is to provide an improved method of and apparatus for operating an electrically propelled ship at full and maneuvering speeds in a more simple, satisfactory and efficient manner than has heretofore been done. Other objects of my invention will be apparent from the following description and appended claims.

The features which I believe to be patentably characteristic of my invention are definitely indicated in the claims appended hereto. The methods of operating an electrically propelled ship and the novel and improved arrangements of apparatus for carrying out these methods in accordance with my present invention will be understood from the following description taken in connection with the accompanying drawings, in which—

Figure 1:
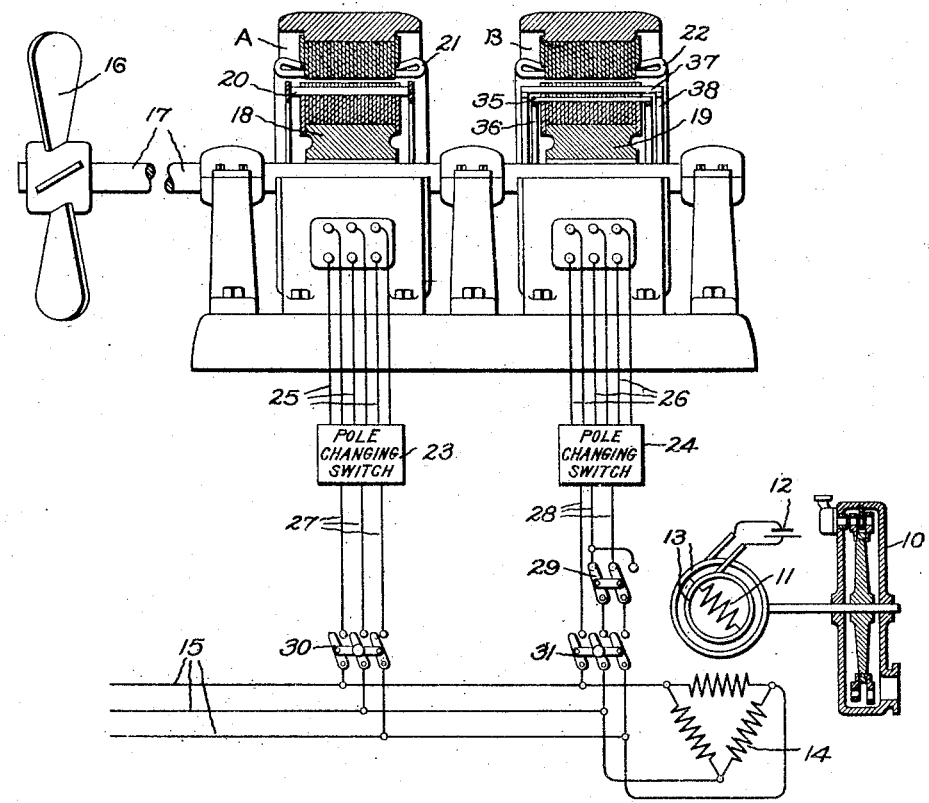
Figure 2:
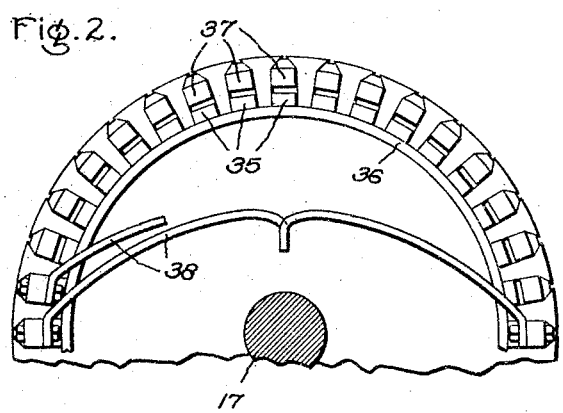
Figure 3:
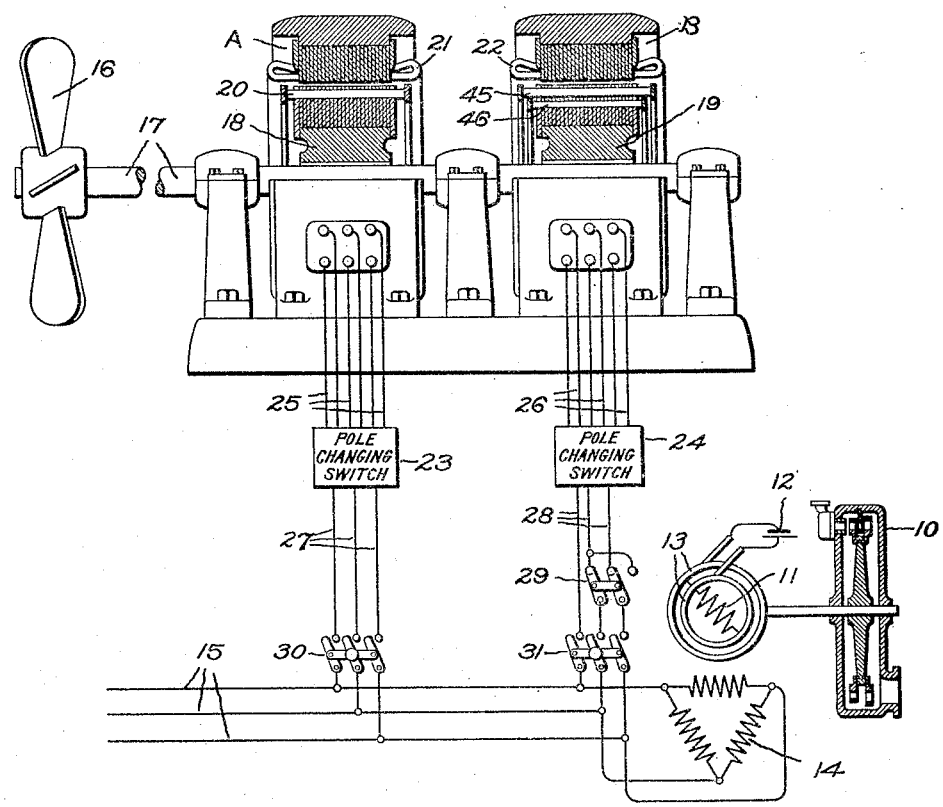
Figure 4:
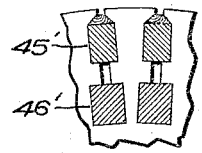

Figure 1 illustrates diagrammatically a system of electric ship propulsion embodying the novel features of my present invention; Fig. 2 is a detail view of the secondary winding of the motor B of the system of Fig. 1; Fig. 3 illustrates diagrammatically a system of propulsion similar to that of Fig. 1, but having a modified type of maneuvering motor B; and Fig. 4 is a detail view of the secondary winding of the maneuvering motor B of the system of Fig. 3.

In my copending application for Letters Patent of the United States, Serial No. 38,807, filed July 8, 1915, I have described the characteristics required for the reversal of a ship and the difficulties encountered in satisfactorily meeting such requirements. In that application I have disclosed the method of increasing the number of primary magnetic poles of a propeller-driving induction motor for obtaining an increased motor torque for maneuvering operations of a ship, such as stopping or reversing from full speed ahead. I have further explained in that application that in addition to pole changing I deem it generally advisable to provide means for accentuating the reversing torque, as for example by increasing the secondary resistance losses of the motor for the low speed polar arrangement, or by increasing the secondary losses at relatively large slips of the motor.

My present system of propulsion comprises a suitably driven alternating current generator supplying energy to a pair of induction motors having their rotors mounted on a propeller shaft. One of the motors has a short-circuited secondary winding of low resistance, and may if desired have a primary winding adapted to produce primary magnetic fields of two different pole numbers, while the other motor has a primary winding adapted to produce primary magnetic fields of two different pole numbers, and preferably is provided with means whereby the secondary resistance losses are increased when the connections for reversal are made. My method of operating such a system consists in employing both motors for running the ship at full speed ahead, and employing one motor alone with increased torque, obtained by lowering the speed ratio of this motor with respect to the frequency of the source of energy supply, for reversing the direction of motion of the ship. Where high economy at cruising speeds is desired, the motor having the short-circuited low resistance secondary winding is adapted for pole-changing and is used alone with its primary winding then connected for its low speed pole number.

Referring now to Fig. 1 of the drawings, there is diagrammatically represented an elastic-fluid turbine 10 mechanically coupled to a polyphase alternator. I have shown for the purpose of illustration an alternator of the revolving field type having an exciting winding 11 supplied with direct current from any suitable source 12 by means of slip rings 13 and coöperating brushes. The alternator has a polyphase stator winding 14 connected to bus bars 15, or the like. A propeller 16 is mounted on the same shaft 17 as the rotors 18 and 19 of a pair of induction motors A and B. In the drawings, I have illustrated the secondary windings of the motors as carried by the rotor members and the primary windings as mounted in the stator members, but it will of course be understood that the primary windings may be carried by the rotor members, in which case the secondary windings will be incorporated in the stator members.

The motor A has a short-circuited secondary winding 20 of low resistance, such as a low resistance squirrel cage winding. The primary windings 21 and 22 of the motors A and B are each adapted to be arranged for a plurality of different pole numbers. To this end any of the well known means for producing primary magnetic poles of different pole numbers may be employed, and since there are numerous arrangements for effecting this purpose I do not deem it necessary to explain in detail any specific means, but by way of example I will mention a patent of Ernst F. W. Alexanderson, No. 841,609, dated January 15, 1907, as illustrating one way in which an induction motor primary winding may be arranged to produce primary magnetic poles of different pole numbers. For the purpose of explaining my present invention, I have illustrated pole-changing switches 23 and 24 connected by six leads 25 and 26 to the primary windings 21 and 22, respectively and to the bus bars 15 by three leads 27 and 28 respectively. This diagrammatic representation of a primary winding adapted for pole-changing will be well understood by those skilled in the art. A reversing switch 29 is associated with the leads 28 of the maneuvering motor B and serves to reverse the phase rotation between the magnetic fields of the alternator and motor in the well understood manner. Suitable switches 30 and 31 are associated with the leads 27 and 28, respectively.

The pole-changing switches 23 and 24 change the speed ratios of the motors A and B with respect to the frequency of the alternator. The relative values of these speed ratios will be determined by the particular conditions to be met, such as the desired high and cruising speeds of the ship, and the magnitude of the reversing torque required for such a ship. The high speed pole numbers of the primary windings 21 and 22 of the motors A and B are the same, so that for full speed these motors have the same synchronous speed. The low speed pole numbers of the primary windings 21 and 22 may or may not be the same, since in general it will not be desirable to jointly operate the two motors A and B at the lower speed ratio. For running the ship at full speed ahead, the primary windings 21 and 22 are arranged for their high speed pole numbers and both motors and connected to the bus bars 15. For normal cruising at lower speeds, motor B is disconnected from the bus bars 15 by means of the switch 31 and the primary winding 21 of motor A is arranged for its low speed pole number. For reversing, the motor A is disconnected from the bus bars 15 by means of the switch 30 and the motor B is used alone with the primary winding 22 arranged for its low speed pole number.

I believe it will generally be found desirable to provide means for accentuating the torque of the maneuvering motor B for its lower speed ratio. This can be advantageously done by providing this motor with a secondary winding which has low effective resistance for the high speed pole number and relatively high effective resistance for the low speed pole number of the primary winding. Merely for the purposes of explanation I have in the accompanying drawings illustrated a compound or double secondary winding. One winding is made up of relatively high resistance conductor bars 35 connected at their ends to end rings 36 to form a squirrel cage winding of relatively high resistance. This winding is obviously effective for any pole number of the primary winding. The other winding consists of low resistance conductor bars 37 having end connectors 38 connecting the bars as a polar winding. The end connectors are so designed that the pitch of the conductor bars 37 is substantially 100 per cent. when the primary winding 22 is arranged for the high speed pole number and in the neighborhood of 200 per cent. when the primary winding is arranged for the low speed pole number. Thus, the conductor bars 37 form a low resistance path for the secondary current when the primary winding 22 is arranged for its high speed pole number and are substantially open-circuited when the primary winding is arranged for its low speed pole number.

The torque of the maneuvering motor B, for a given generator output, is increased by increasing the number of primary poles, since increasing the pole number of the primary winding corresponds to increasing the speed reduction between the prime mover and the propeller shaft. The reversing torque is further accentuated by the character of the secondary winding, which provides a secondary circuit of relatively high effective resistance for the low speed pole number. For running the ship at full speed ahead a maximum power is required, and to meet this demand both motors A and B are used. For this speed ratio both motors operate at high efficiency, since each is provided with a low resistance secondary winding. For normal running ahead at low speeds where the power required does not make necessary the use of both motors, the motor A is used alone with its primary winding arranged for its low speed pole number. Since the motor A has a short-circuited secondary winding of low resistance, its operation at this lower speed ratio will be at high efficiency. When connections for reversal are made only the maneuvering motor B is left in circuit. In the act of reversal the stator winding 22 of the motor B will carry abnormally high currents for a brief interval, and its secondary winding, affording a relatively high effective resistance, will produce the high torque required. The maneuvering operation of a ship lasts for relatively very short intervals of time, and it is not required that the propelling apparatus operate economically during these brief intervals. The pole-changing arrangement and increased effective resistance of the secondary winding of the motor B thus provide a satisfactory reversing torque with little or no distortion of the normal operating characteristics of the pair of motors when operated together as a unit.

In Fig. 3 of the drawings, I have shown a system of propulsion similar to that of Fig. 1, the only difference in the two systems residing in the secondary winding of the maneuvering motor, which has in the system of Fig. 3 relatively high effective resistance at large motor slips. Similar pieces of apparatus in the two systems are represented by the same reference character. The maneuvering motor B of the system of Fig. 3 has a secondary winding of inductively changing effective resistance, that is to say, the effective resistance of the winding inductively changes, so that the effective resistance varies as a direct function of the frequency of the secondary current. Such a winding has relatively high effective resistance when the secondary current is of high frequency and relatively low effective resistance when the secondary current is of low frequency. It will, of course, be understood that I mean by secondary current of high frequency, current of that frequency induced in the secondary winding when the slip of the motor is relatively large, and by current of low frequency, current of that frequency induced in the secondary winding when the slip of the motor is relatively small.

Numerous constructions and arrangements for obtaining a secondary winding having an inductively changing effective resistance are known in the art, and I have, merely for the purposes of illustration, shown in the accompanying drawings a double squirrel cage winding, comprising two complete squirrel cage windings 45 and 46. The winding 45 has relatively high ohmic resistance and low inductance, while the winding 46 has relatively low ohmic resistance and high inductance. The conductor bars 45' of the squirrel cage winding 45 have relatively high ohmic resistance and are located in slots near the surface of the magnetic core of the rotor, and thus the winding as a whole has little inductance. On the other hand, the conductor bars 46' of the winding 46 have low ohmic resistance and are located in slots well beneath the surface of the rotor, and since these conductor bars are substantially embedded in the magnetic material of the rotor, the winding 46 as a whole has high inductance. On account of its high self-induction, the low resistance winding 46 will carry very little current when the frequency of the secondary current is high, and consequently under this condition the secondary current will be forced into the high resistance winding 45', thus providing an increased torque of the motor when the slip is large. On the other hand, as the frequency of the secondary current diminishes, more and more current flows through the low resistance winding 46, until at normal slip the motor has the desirable running characteristics of an induction motor with an ordinary squirrel cage secondary winding.

For normal running ahead at low speeds, where the power required does not make necessary the use of both motors, either one of the two motors may be used alone with its primary winding arranged for its low speed pole number. Each of the motors has a short circuited secondary winding of low resistance for the lower speed ratio, provided the motor slip is normal, and, therefore, either may be operated at high efficiency for cruising speeds. It will thus be noted that the arrangement of Fig. 3 affords the added advantage that either of the two motors can be used alone for normal running ahead at cruising speeds with high economy. When connections for reversal are made, the slip of the maneuvering motor B increases very materially, since at the instant of reversal the rotor revolves in the opposite direction to the primary magnetic field. The secondary current is then of relatively high frequency, being in fact nearly double the frequency of the primary current, and the secondary resistance losses are relatively large, due to the inductively changing effective resistance of the secondary winding, and thus the high torque required for reversing is developed.

Where the two motors are connected in parallel, as illustrated in Figs. 1 and 3 of the drawings, the quality of current and load division during their joint operation will depend upon their relative proportions. Generally, the motors are so designed as to give a fairly equal division of current or heating effect at maximum load, or rather a division which suits the relative sizes of the motors, since there is nothing in the principle of my invention which requires the motors to be of equal sizes. Where the motors are of equal sizes they may of course be jointly operated with their primary windings in series so that they will carry equal currents.

The novel arrangements of apparatus in accordance with my present invention are capable of giving an increased torque in reversing with lighter apparatus and better power factor under normal operating conditions than can be obtained in any other system of electric propulsion with which I am acquainted. The arrangement of two motors on a propeller shaft in accordance with my present invention provides a propelling apparatus adapted to operate at high efficiency for cruising and full speeds ahead and with large torque for reversing. The torque is increased when the reversing connections are made for three distinct reasons. (1) A generator of desirable proportions will produce a larger torque when operating on one of a pair of similar motors than when operating on the two motors in parallel. The limitation of current is largely in the generator, and the one motor acts as the equivalent of the two motors, both of which have higher secondary resistance. That is, it makes available a higher secondary resistance and thus affords more torque. (2) The change to a larger number of poles gives a higher speed reduction and consequently more torque. This will be understood by remembering that the generator and motor act as a speed-reducing mechanism between the prime mover and the propeller shaft, and that for the purposes of reversal the generator output is utilized at a lower propeller speed, whereby the propeller torque is increased. (3) The motor B is designed to give an increased torque when connected for maneuvering, or an increased torque under maneuvering conditions, while the motor A is not.

What I claim as new and desire to secure by Letters Patent of the United States, is:—

1. The method of operating a system of electric ship propulsion having a propeller adapted to be driven by two induction motors which consists in jointly operating both of said motors at a desired speed ratio with respect to the frequency of a source of alternating current energy for running the ship at full speed ahead, operating one of said motors alone at a lower speed ratio than the first mentioned desired speed ratio and with relatively small secondary losses for cruising speeds of the ship, and operating the other of said motors alone with increased torque by lowering the speed ratio of this motor as compared with the first mentioned desired speed ratio and by increasing the secondary losses of the motor for reversing the direction of motion of the ship.

2. A system of electric ship propulsion comprising a propeller, two induction motors adapted to drive said propeller, the first of said induction motors having a low resistance secondary winding and the second of said induction motors having a primary winding adapted to produce a primary magnetic field of the same number of poles as the primary winding of said first induction motor and also a second primary magnetic field of a higher number of poles and also having secondary conductors a portion of which provides a relatively high resistance path for the secondary current with the higher number of primary poles and the other portion providing a low resistance path for the secondary current with the lower number of primary poles, a source of alternating current energy, and means for connecting the second induction motor for the lower number of primary poles and supplying electric energy from said source to both motors for running the ship at full speed ahead and for connecting the second induction motor for the higher number of primary poles and supplying electric energy to this motor alone for reversing the direction of motion of the ship.

3. A system of electric ship propulsion comprising a propeller, two induction motors adapted to drive said propeller, a source of alternating current, the first of said motors having a primary winding adapted to be connected for two different speed ratios with respect to the frequency of said alternating current and also having secondary conductors a portion of which provides a relatively high resistance path for the secondary current with the lower speed ratio and the other portion providing a low resistance path for the secondary current with the higher speed ratio, the second of said induction motors having a speed ratio corresponding to the higher speed ratio of the first motor, and means for connecting the first motor for its higher speed ratio and supplying electric energy from said source to both motors for running the ship at full speed ahead and for connecting the first motor for its lower speed ratio and supplying electric energy to this motor alone for reversing the direction of motion of the ship.

4. A system of electric ship propulsion comprising a propeller, two induction motors adapted to drive said propeller, the first of said induction motors having a low resistance secondary winding and the second of said induction motors having a primary winding adapted to produce a primary magnetic field of the same number of poles as the primary winding of said first induction motor and also a second primary magnetic field of a higher number of poles and also having two secondary windings one of which is a short-circuited winding of relatively high resistance and the other a definite winding which is substantially open-circuited for the higher number of primary poles but of low resistance for the lower number of primary poles, a source of alternating current energy, and means for connecting the second induction motor for the lower number of primary poles and supplying electric energy from said source to both motors for running the ship at full speed ahead and for connecting the second induction motor for the higher number of primary poles and supplying electric energy to this motor alone for reversing the direction of motion of the ship.

In witness whereof, I have hereunto set my hand this 7th day of July 1915.

WILLIAM L. R. EMMET.

Copies of this patent may be obtained for five cents each, by addressing the "Commissioner of Patents, Washington, D. C."

It is hereby certified that in Letters Patent No. 1,290,946, granted January 14, 1919, upon the application of William L. R. Emmet, of Schenectady, New York, for an improvement in "Electric Ship Propulsion," an error appears in the printed specification requiring correction as follows: Page 2, line 67, for the word "and" second occurrence, read *are;* and that the said Letters Patent should be read with this correction therein that the same may conform to the record of the case in the Patent Office.

Signed and sealed this 25th day of February, A. D., 1919.

[SEAL.]

F. W. H. CLAY,
*Acting Commissioner of Patents.*

Cl 172—8.